(12) United States Patent
Clapper

(10) Patent No.: US 10,217,490 B2
(45) Date of Patent: Feb. 26, 2019

(54) FACILITATING ACCESS TO DIGITAL VIDEO

(71) Applicant: Intel Corporation, Santa Clara, CA (US)

(72) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 882 days.

(21) Appl. No.: 14/447,740

(22) Filed: Jul. 31, 2014

(65) Prior Publication Data

US 2014/0344699 A1   Nov. 20, 2014

Related U.S. Application Data

(63) Continuation of application No. 11/095,236, filed on Mar. 25, 2005, which is a continuation of application (Continued)

(51) Int. Cl.
*G11B 27/031*   (2006.01)
*G11B 27/10*   (2006.01)
(Continued)

(52) U.S. Cl.
CPC ........ *G11B 27/102* (2013.01); *G06F 3/04817* (2013.01); *G06F 3/04842* (2013.01);
(Continued)

(58) Field of Classification Search
CPC ..... G11B 27/031; G11B 27/036; G11B 27/06; G06F 17/30056
See application file for complete search history.

(56) References Cited

U.S. PATENT DOCUMENTS

| 5,237,648 A | * | 8/1993 | Mills | G11B 27/028 345/474 |
| 5,359,712 A | * | 10/1994 | Cohen | G11B 27/034 348/E5.051 |

(Continued)

FOREIGN PATENT DOCUMENTS

| EP | 0915471 A2 | 5/1999 |
| EP | 0920014 A1 | 6/1999 |

(Continued)

OTHER PUBLICATIONS

International Preliminary Examination Report in PCT Application PCT/US01/02771, dated Feb. 21, 2002.

(Continued)

*Primary Examiner* — Doon Y Chow
*Assistant Examiner* — Le V Nguyen
(74) *Attorney, Agent, or Firm* — Christopher K. Gagne

(57) ABSTRACT

A digital video editing system uses a graphical user interface which facilitates the selection of a video sequence of interest and its representation in a conveniently visualized form. Through the graphical user interface, the user may select a starting frame, a time interval, and a number of frames within the time interval which may be represented by thumbnail depictions of selected video frames. Once the video sequence is represented by a selected sequence of video frames over a selected interval, the user can then use editing techniques to manipulate the portions of the video sequence represented by the thumbnail depictions.

29 Claims, 4 Drawing Sheets

Related U.S. Application Data

No. 09/528,628, filed on Mar. 20, 2000, now Pat. No. 6,925,602.

(51) Int. Cl.

| | | |
|---|---|---|
| *G11B 27/034* | (2006.01) | |
| *G11B 27/34* | (2006.01) | |
| *G06F 3/0481* | (2013.01) | |
| *G06F 3/0484* | (2013.01) | |
| *G11B 27/02* | (2006.01) | |

(52) U.S. Cl.
CPC .......... *G11B 27/031* (2013.01); *G11B 27/034* (2013.01); *G11B 27/105* (2013.01); *G11B 27/34* (2013.01); *G11B 27/02* (2013.01); *G11B 27/10* (2013.01); *G11B 2220/2562* (2013.01)

(56) References Cited

U.S. PATENT DOCUMENTS

| | | | | |
|---|---|---|---|---|
| 5,412,773 A | * | 5/1995 | Carlucci | G11B 27/032 348/104 |
| 5,513,306 A | | 4/1996 | Mills | |
| 5,675,752 A | * | 10/1997 | Scott | G06F 8/38 715/202 |
| 5,760,767 A | | 6/1998 | Shore | |
| 5,808,614 A | | 9/1998 | Nagahara | |
| 5,818,436 A | | 10/1998 | Imai | |
| 5,838,938 A | | 11/1998 | Morgan | |
| 5,864,340 A | * | 1/1999 | Bertram | G06F 15/025 715/217 |
| 5,893,101 A | | 4/1999 | Balogh | |
| 5,963,203 A | | 10/1999 | Goldberg | |
| 5,966,122 A | | 10/1999 | Itoh | |
| 5,982,350 A | * | 11/1999 | Hekmatpour | H04N 5/262 345/473 |
| 5,999,173 A | | 12/1999 | Ubillos | |
| 6,018,671 A | | 1/2000 | Bremer | |
| 6,028,603 A | | 2/2000 | Wang | |
| 6,034,746 A | | 3/2000 | Desai | |
| 6,118,444 A | * | 9/2000 | Garmon | G06F 3/0219 348/722 |
| 6,154,601 A | * | 11/2000 | Yaegashi | G11B 27/034 386/230 |
| 6,172,685 B1 | | 1/2001 | Pandit | |
| 6,237,025 B1 | | 5/2001 | Ludwig | |
| 6,278,447 B1 | | 8/2001 | Anderson | |
| 6,292,620 B1 | * | 9/2001 | Ohmori | G11B 27/031 386/230 |
| 6,321,024 B1 | | 11/2001 | Fujita | |
| 6,351,765 B1 | | 2/2002 | Pietropaolo | |
| 6,393,054 B1 | | 5/2002 | Altunbasak | |
| 6,400,375 B1 | | 6/2002 | Okudaira | |
| 6,411,771 B1 | | 6/2002 | Aotake | |
| 6,424,677 B1 | | 7/2002 | Moeller | |
| 6,430,355 B1 | | 8/2002 | Nagasawa | |
| 6,452,610 B1 | | 9/2002 | Reinhardt | |
| 6,469,711 B2 | | 10/2002 | Foreman | |
| 6,510,458 B1 | * | 1/2003 | Berstis | G06F 17/30902 707/999.01 |
| 6,546,188 B1 | | 4/2003 | Ishii | |
| 6,597,375 B1 | * | 7/2003 | Yawitz | G11B 27/034 715/723 |
| 6,628,303 B1 | | 9/2003 | Foreman | |
| 6,675,386 B1 | | 1/2004 | Hendricks | |
| 6,807,306 B1 | | 10/2004 | Girgensohn | |
| 6,925,602 B1 | | 8/2005 | Clapper | |
| 6,976,229 B1 | | 12/2005 | Balabanovic | |
| 6,983,420 B1 | | 1/2006 | Itou | |
| 7,242,847 B1 | | 7/2007 | Davies | |
| 2001/0041049 A1 | | 11/2001 | Kanda | |
| 2001/0041053 A1 | * | 11/2001 | Abecassis | A63F 13/10 386/291 |
| 2005/0204288 A1 | | 9/2005 | Clapper | |
| 2014/0344699 A1 | | 11/2014 | Clapper | |
| 2016/0012854 A1 | | 1/2016 | Clapper | |

FOREIGN PATENT DOCUMENTS

| | | |
|---|---|---|
| EP | 0999504 A1 | 5/2000 |
| TW | 519835 B | 2/2003 |
| WO | 2001/071719 A1 | 9/2001 |

OTHER PUBLICATIONS

Notification of Transmittal of the International Search Report (and attached International Search Report) in PCT Application PCT/US01/02771, dated Jan. 26, 2001.
Office Action in EPO Application 01910363.9, dated Apr. 12, 2007.
Office Action in U.S. Appl. No. 14/447,740 (and related attachments), dated May 18, 2017.
Office Action in U.S. Appl. No. 11/095,236 (and related attachments), dated Sep. 11, 2015.
Office Action in U.S. Appl. No. 11/095,236 (and related attachments), dated Mar. 12, 2015.
Office Action in U.S. Appl. No. 11/095,236 (and related attachments), dated Feb. 11, 2014.
Office Action in U.S. Appl. No. 11/095,236 (and related attachments), dated Dec. 2, 2013.
Office Action in U.S. Appl. No. 11/095,236 (and related attachments), dated Jul. 3, 2013.
Office Action in U.S. Appl. No. 11/095,236 (and related attachments), dated Apr. 19, 2012.
Office Action in U.S. Appl. No. 11/095,236 (and related attachments), dated Feb. 1, 2012.
Office Action in U.S. Appl. No. 11/095,236 (and related attachments), dated Nov. 4, 2011.
Office Action in U.S. Appl. No. 11/095,236 (and related attachments), dated May 16, 2011.
Office Action in U.S. Appl. No. 11/095,236 (and related attachments), dated Apr. 12, 2011.
Office Action in U.S. Appl. No. 11/095,236 (and related attachments), dated Feb. 18, 2011.
Office Action in U.S. Appl. No. 11/095,236 (and related attachments), dated Jan. 13, 2011.
Office Action in U.S. Appl. No. 11/095,236 (and related attachments), dated Oct. 27, 2010.
Office Action in U.S. Appl. No. 11/095,236 (and related attachments), dated Apr. 27, 2010.
Office Action in U.S. Appl. No. 11/095,236 (and related attachments), dated Jan. 29, 2010.
Office Action in U.S. Appl. No. 11/095,236 (and related attachments), dated Nov. 24, 2009.
Office Action in U.S. Appl. No. 11/095,236 (and related attachments), dated Apr. 29, 2009.
Notice of Allowance in U.S. Appl. No. 09/528,628 (and related attachments), dated Jan. 12, 2005.
Decision on Appeal in U.S. Appl. No. 09/528,628 (and related attachments), dated Aug. 18, 2004.
Office Action in U.S. Appl. No. 09/528,628 (and related attachments), dated Jun. 3, 2003.
Office Action in U.S. Appl. No. 09/528,628 (and related attachments), dated Feb. 6, 2003.
Office Action in U.S. Appl. No. 09/528,628 (and related attachments), dated Jan. 3, 2003.
Office Action in U.S. Appl. No. 09/528,628 (and related attachments), dated Sep. 17, 2002.
Office Action dated Mar. 7, 2018 in U.S. Appl. No. 14/447,740, and related attachments.
Office Action dated Apr. 19, 2018 in U.S. Appl. No. 14/862,929, and related attachments.
Office Action dated Nov. 2, 2018 in U.S. Appl. No. 14/862,929, and related attachment.

* cited by examiner

*FIG. 1*

FACILITATING ACCESS TO DIGITAL VIDEO

CROSS-REFERENCE TO RELATED APPLICATIONS

This application is a continuation of U.S. patent application Ser. No. 11/095,236, filed on Mar. 25, 2005, which is a continuation of U.S. patent application Ser. No. 09/528,628, filed on Mar. 20, 2000, which issued as U.S. Pat. No. 6,925,602 on Aug. 2, 2005.

BACKGROUND

This invention relates generally to editing video stored in a digital format.

A number of formats for digital video currently exist. For example, in connection with so called broadcast pause and resume systems, a conventional hard disk drive may be utilized to store streaming television programming. These systems may alternatively read and write video from and to the same storage medium such as a hard disk drive. In addition, digital video may be stored on a digital versatile disk or other optical storage media.

Once the video has been stored in a digital format, manipulation of that video may be undertaken using processor-based systems. For example, conventional digital versatile disk players may incorporate a selective zoom function wherein the user may use a remote control to zoom a portion of the picture in a selected quadrant.

However, in most conventional digital formats, the ability to edit the stored video is relatively limited. The user can replay the information by selecting zoom features, slow motion, stills, and other techniques but the ability to manipulate the data is still relatively limited.

Thus, there is a need for more ways to manipulate digital video data stored on digital storage media.

BRIEF DESCRIPTION OF THE DRAWINGS

Some embodiments are described with respect to the following figures:

FIG. 1 is a screen display in accordance with one embodiment of the present invention;

DETAILED DESCRIPTION

Figure 1:
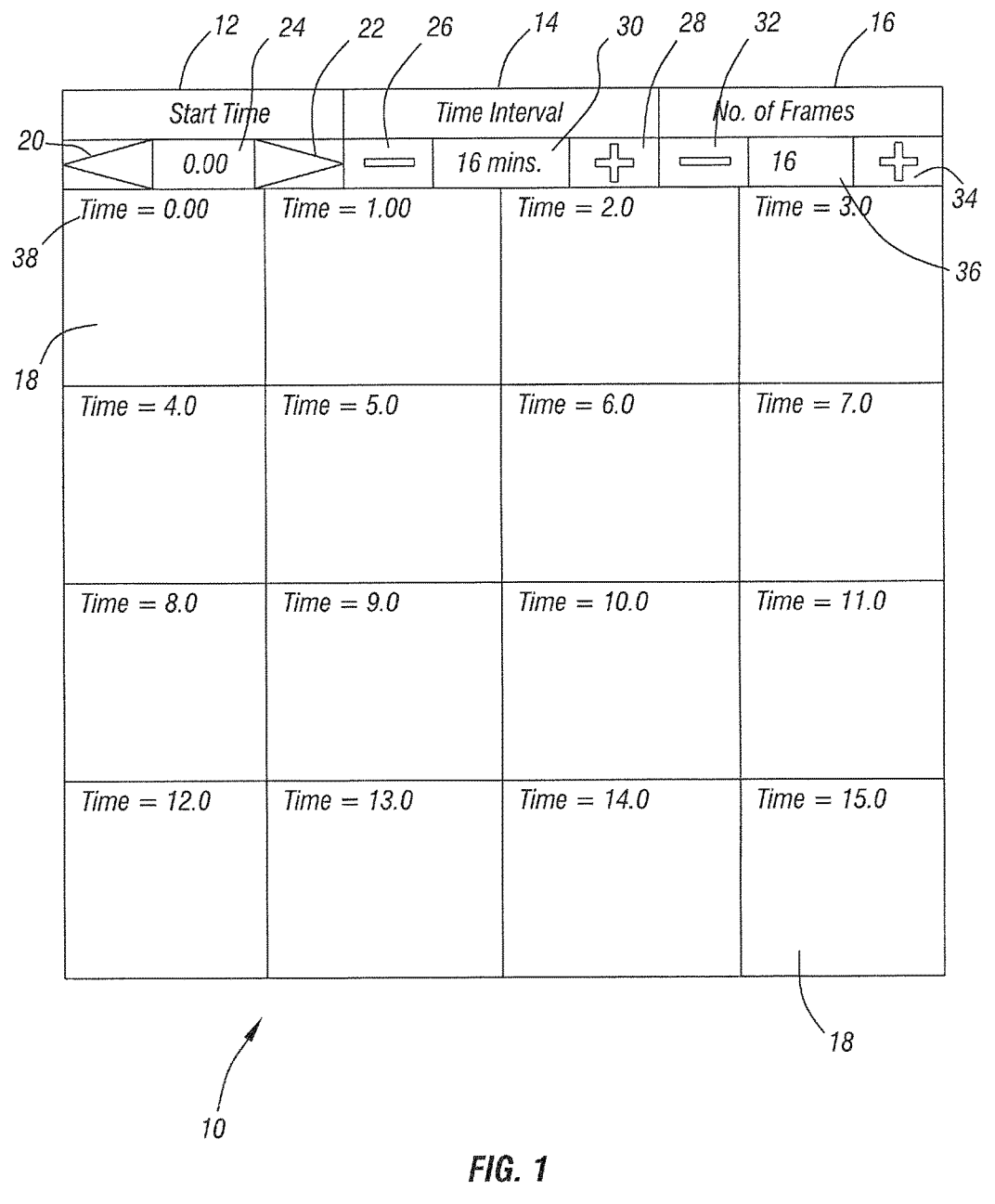
Figure 2:
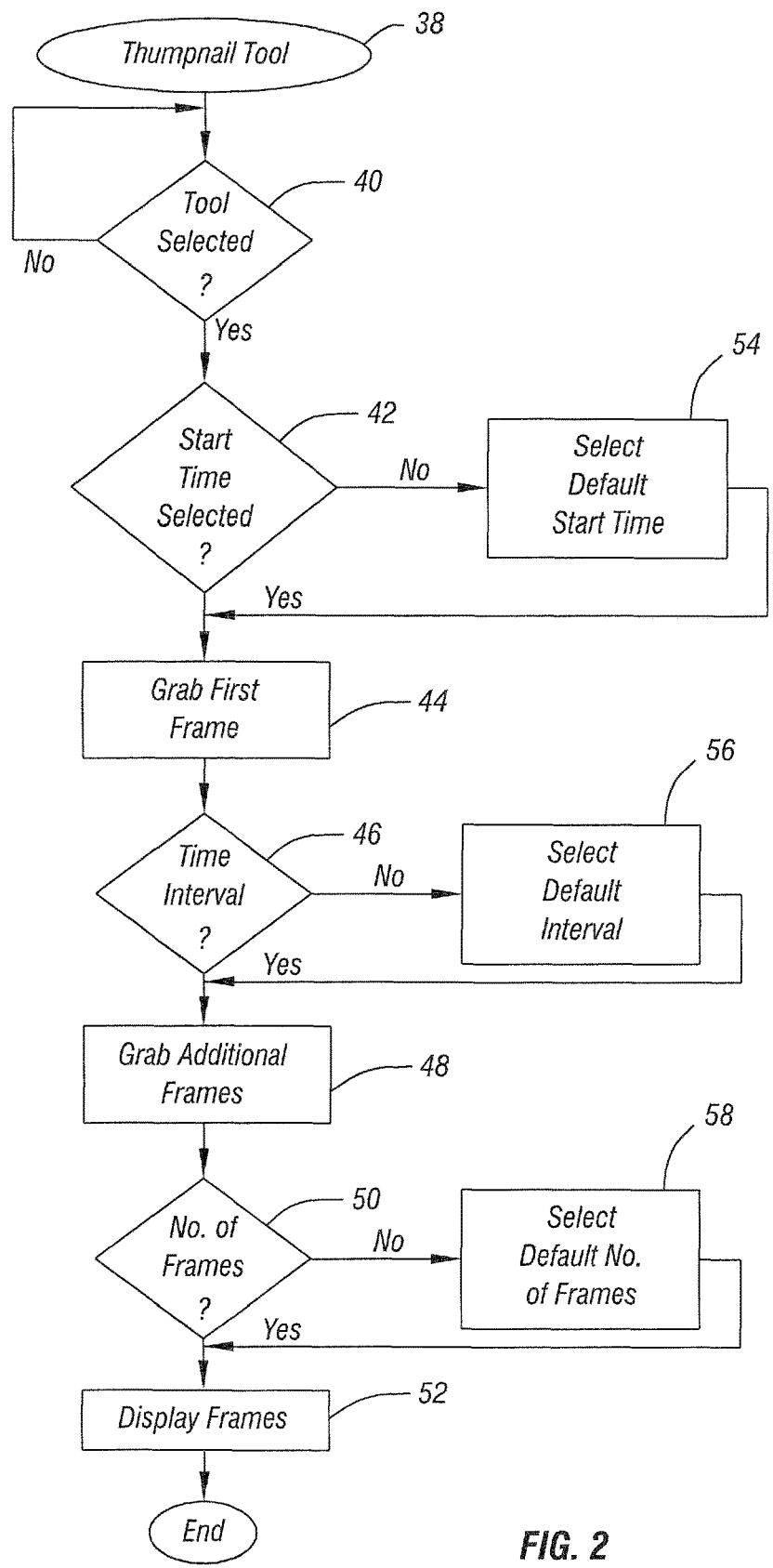
FIG. 2 is a flow chart for use in connection with the screen display shown in FIG. 1.

Referring to FIG. 1, a graphical user interface 10 which may be displayed on a display screen of a processor-based system is useful in editing digital video data. The display screen may be any of a variety of video displays. For example, the screen may be a liquid crystal display on a video camera, a monitor for a computer system or a television receiver coupled to a set-top box.

The graphical user interface 10 may be utilized to selectively manipulate digital data in the form of a plurality of video frames 18. The plurality of frames 18 may be automatically displayed as a storyboard or gridwork of thumbnail displays. Thus, each frame is shown in a reduced size commonly called a "thumbnail". A video sequence to be edited may be represented by the thumbnail frames. The sequence may be selected from a longer video by choosing a start time and a time interval from the start frame. The number of thumbnail frames over the selected interval, taken at regular times, may also be selected.

The user may use an icon 12 to indicate the start time for the selection of the thumbnails 18. The time interval icon 14 may be utilized to indicate the amount of time within a longer video sequence which is of interest. The icon 16 allows the number of frames within the selected time interval, starting at the start time, to be selected by the user. For example, with the start time icon 12, an increase button interface 22 and a decrease button 20 are provided on either side of a display 24 vary the selected start time. The display 24 may indicate the selected start frame by a time indicator.

The frames of any video sequence may be enumerated using a conventional time based system such as the standard promulgated by the Society of Motion Picture and Television Engineers (White Plains, N.Y. 10607) denominated as SMPTE 12M-1999 Television, Audio and Film-Time and Control Code. Each frame may be identified by a time in hours, minutes, seconds and thirtieths of seconds, with video having 30 frames per second. A start time may be indicated in second fractions, seconds, minutes and hours.

When the user presses the increase button interface 22, the start time, displayed on the display 24, increases. Similarly, the time interval, during which the thumbnails 18 are selected, may be controlled by an icon 28 which causes the time interval to be increased, and an icon 26 which decreases the time interval. In the illustrated embodiment, the start time is the time zero and the time interval is sixteen minutes. Thus, sixteen minutes of video are selected for producing the thumbnails. The number of frames selected within the time interval, entered through the icon 16, may be increased with the button interface 36 and decreased with the button interface 32. The number of frames are indicated in the display 34 as being sixteen in the illustrated embodiment.

Thus, as indicated below the icons 12, 14 and 16, sixteen thumbnail frames at one minute time intervals are displayed. A frame is selected at the beginning of each one minute increment. For each minute of video, using video at thirty frames per second, one thousand eight hundred frames are represented by the single starting frame illustrated as a thumbnail 18. Thus, each minute after the initial starting time of zero, a frame is selected and displayed as a thumbnail 18 until sixteen frame thumbnails 18 are displayed. Since the number of selected frames was sixteen, sixteen minutes were selected as the interval and the start time was zero, starting from the beginning of the video, sixteen thumbnail frames 18 are displayed, one for each one minute of video.

The user may increase the start time from that illustrated in FIG. 1 and may increase or decrease the selected time interval and the number of frames as described previously. Thus, the user can select a given resolution in the terms of the number of frames to control the manipulation of the video sequence. The length of the video sequence in terms of the time interval may also be selected. Likewise, the location of the video sequence of interest may be controlled.

Once a representation of a given time interval of a video sequence is created, via the graphical user interface 10, the user can set about editing that video sequence. For example, sections of the time interval of video frames, displayed on the graphical user interface 10 may be eliminated by simply indicating a start and stop frame 18 for the group of frames to be eliminated. The start and stop frames and the intervening frames (between the start and stop frames) are thereby eliminated.

Similarly, different video effects may be applied selectively to a video sequence represented by the thumbnail frames 18. For example, fade ins, fade outs or other video effects may be provided. The light intensity of the various frames may be changed as well. The graphical user interface 10 provides a convenient way to manipulate a given section of video data. Through the use of the icons 12, 14 and 16, the window which defines the way the video sequence is visualized for editing purposes may be easily adjusted by the user.

The software 38 for implementing the graphical user interface 10, shown in FIG. 2, begins by determining whether the graphical user interface 10 has been selected as indicated in diamond 40. If so, the flow waits for a start time selection through the icon 12. Once the start time is selected, the first frame is designated, grabbed and stored as indicated in block 44. Next, the flow waits for the time interval selection as indicated in diamond 46. Once that selection is made, the portion of the video which is of interest is defined and the corresponding frames may be grabbed as indicated in block 48. Finally, the number of frames that are utilized to represent the video may be provided in response to a query represented by the diamond 50. Once that information is provided, the software 38 may then display the graphical user interface 10. If any of the selections are not timely made through the icons 12, 14 and 16, default values may be entered automatically.

Figure 3:
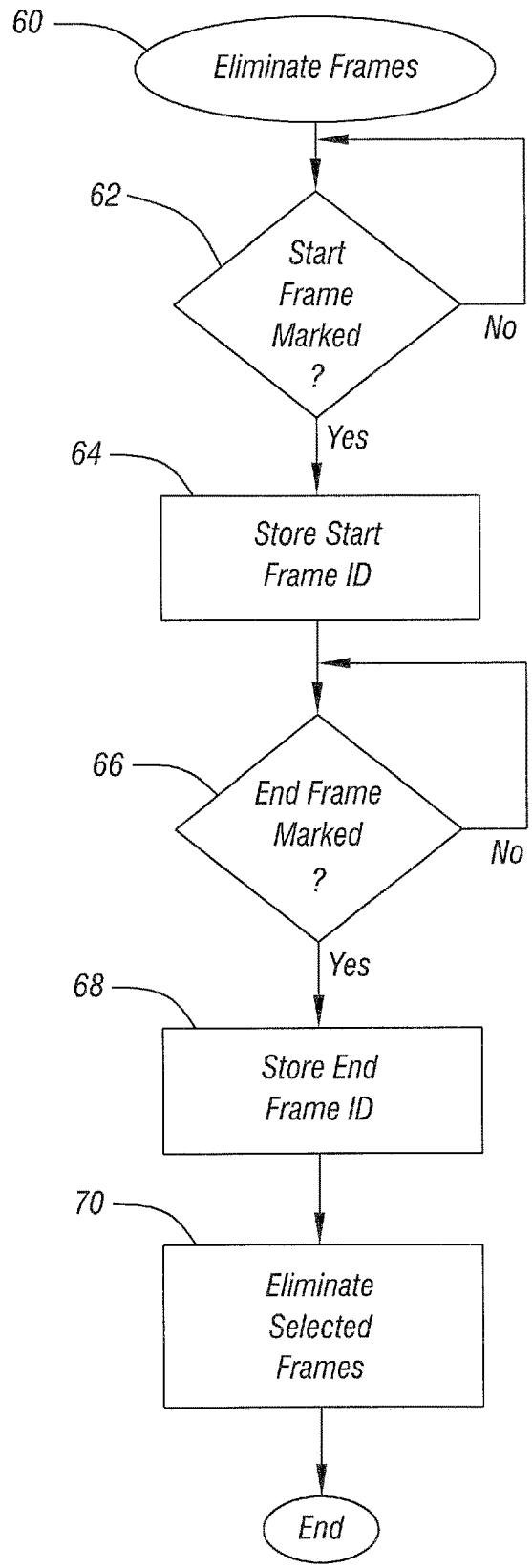
FIG. 3 is a flow chart for use in connection with the screen display shown in FIG. 1.

Referring next to FIG. 3, the software 60 for editing the video represented by the graphical user interface 10 may implement a frame elimination protocol in one embodiment of the present invention. Initially, the user indicates a start frame as indicated in diamond 62. Once the user indicates a start frame, that start frame identifier is stored as indicated in block 64. The identifier may include an hour, minute, second, and subsecond designation of the particular frame in the sequence. That information may be provided in a header associated with the frame. Next, the software 60 awaits the user's input of an end frame as indicated in diamond 66. Once this input is received, the end frame identifier may be stored as indicated in block 68. The intervening frames are then eliminated as indicated in block 70.

In this way, the graphical user interface 10 provides an easy way for the user to visualize a sequence of video. The software 38 creates a graphical user interface 10, including the icons 12, 14 and 16, that facilitates the manipulation of the storyboard which represents a video sequence.

Embodiments of the present invention may be used as a suppression tool, suppressing access to offensive or obscene video portions. For example, a parent may wish to prevent a child from viewing portions of a video. With the present invention, a series of frames of video may be tagged to prevent viewing under certain circumstances. For example, an access code may be required to view the tagged sequence of frames.

Another application for embodiments of the present invention is in connection with so-called broadcast pause and resume systems. These systems enable a user to store and replay video at the same time. However, the user must also navigate through the video sequences to facilitate the broadcast pause and resume features. Using embodiments of the present invention, one can readily navigate within the stored video.

Figure 4:
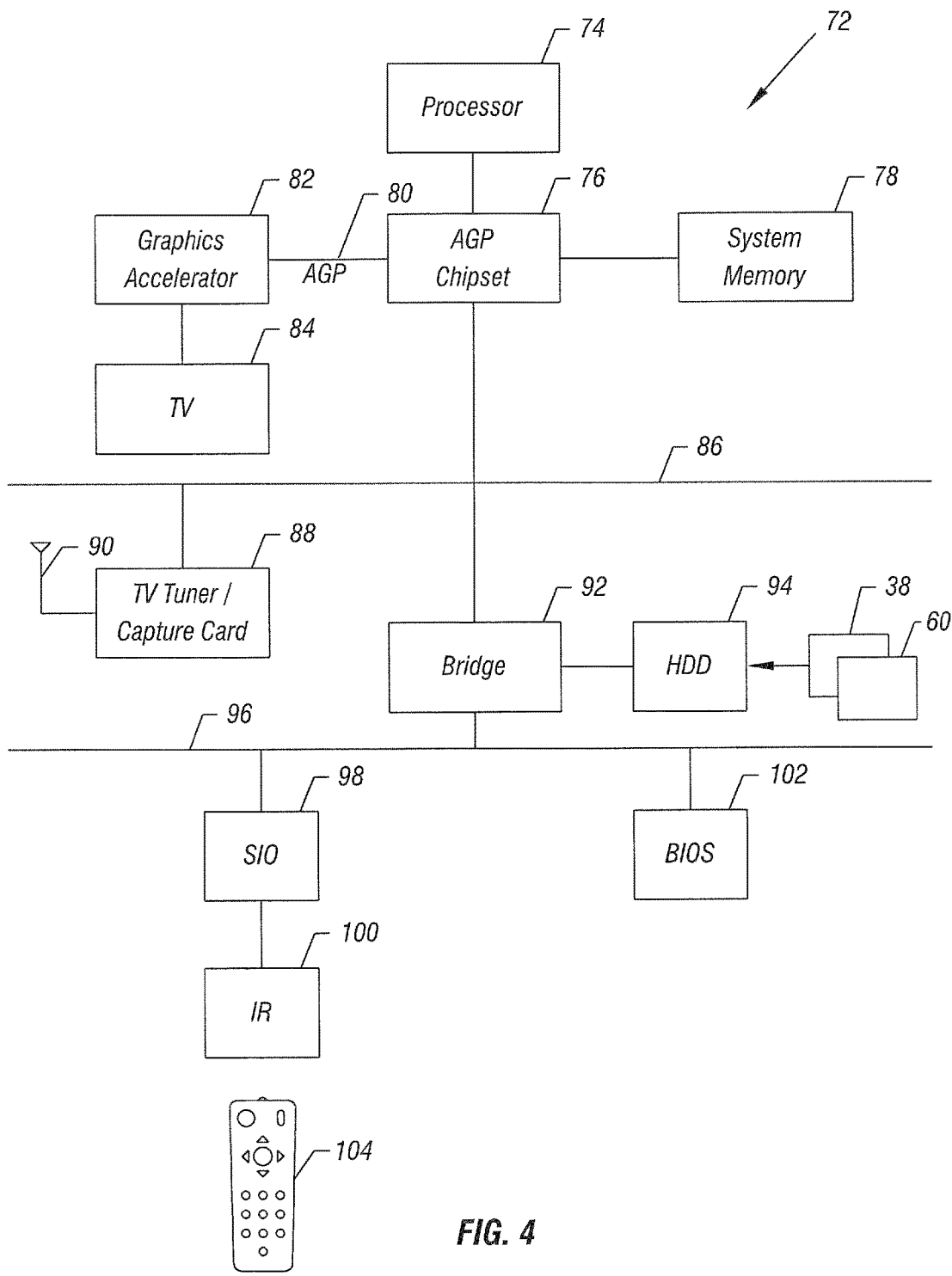
FIG. 4 is a block diagram of hardware for implementing one embodiment of the present invention.

A processor-based system 72, shown in FIG. 4, in accordance with one embodiment of the present invention generates the graphical user interface 10 on a television display 84. The 84 is a set-top box but the present invention is in no way limited to this embodiment. It is applicable to a wide variety of systems which display and store digital video information including digital video cameras, desktop computers, laptop computers, portable and handheld devices, appliances, as examples.

The system 72 includes a processor 74 coupled to an accelerated graphics port (AGP) chipset 76 for implementing an accelerated graphics port embodiment. The chipset 76 communicates with the AGP port 80 and the graphics accelerator 82. A television 84 may be coupled to the video output of the graphics accelerator 82. The graphical user interface 10 may be displayed on the television 84. The television 84 may be coupled to the video output of the graphics accelerator 82. The chipset 76 accommodates the system memory 78.

The chipset 76 is also coupled to a bus 86 which may be, for example, a Peripheral Component Interconnect (PCI) bus. The PCI Local Bus Specification, Rev. 2.2 is available from the PCI Special Interest Group, Portland, Oreg. 97124. The bus 86 connects to a TV tuner/capture card 88 which is coupled to an antenna 90 or other video input such as a cable input, a satellite receiver/antenna or the like. The TV tuner/capture card 88 selects a desired television channel and also performs a video capture function. One exemplary video capture card is the ISVR-III video capture card available from Intel Corporation.

The bus 86 is also coupled to a bridge 92 which couples a hard disk drive 94. The software 38 and 60 may be stored on the hard disk 94 together with the video sequence being manipulated. The bridge 92 is also coupled to another bus 96. The bus 96 may be coupled to a serial input/output device 98. The device 98 is in turn connected to an infrared interface 100 which interacts with a remote control unit 104 which is also infrared based. Also connected to the bus 96 is a basic input/output system (BIOS) 102.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a selection of a start time within a stored video;
   receiving a selection of an end time within the stored video to define a video clip playable separately from said stored video; and
   receiving a selection of a video effect for the clip;
   wherein:
   the method is implemented, at least in part, using a broadcast pause and resume set-top box-based system;
   the system comprises a graphics accelerator via which video output is to be provided;
   the system is to store, at least in part, the stored video;
   the system is to display, using the graphics accelerator, via a television, a graphical user interface for use in selecting the start time, end time, and video effect;
   the graphical user interface comprises a storyboard via which frames of the stored video are to be displayed, at least in part;
   the system is also to receive other selected video input for display via the television, the other selected video input being capable of comprising cable television-based input;
   the system is capable of:
   selectively editing the clip by changing frame light intensity of selected frames of the clip;

after a time period has elapsed in which user selection via the graphical user interface of the start time, time interval, and number of frames has not been made, automatically entering default values for the start time, time interval, and number of frames.

2. The method of claim 1 wherein the video effect is slow motion.

3. The method of claim 1 including receiving a selection for fast motion of the clip.

4. The method of claim 1 wherein the graphical user interface is to be used to select slow or fast motion playback of the clip.

5. The method of claim 1 including receiving a selection of a fade-in or fade-out for the clip.

6. The method of claim 1 including automatically discarding frames from the video to produce the clip.

7. The method of claim 1 including receiving a parental control for the clip.

8. The method of claim 7 including enabling the clip to be tagged for parental control such that an access code is needed to view the clip.

9. The method of claim 1 including enabling the selections via a handheld device.

10. The method of claim 1 wherein the graphical user interface comprises icons for the entry of information concerning the start time, time interval and number of frames for the clip.

11. One or more non-transitory computer readable media storing instructions executed by a processor to perform a sequence comprising:
receiving a selection of a start time within a stored video;
receiving a selection of an end time within the stored video to define a video clip playable separately from said stored video; and
receiving a selection to change the clip to play in slow motion;
wherein:
the sequence is implemented, at least in part, using a broadcast pause and resume set-top box-based system;
the system comprises a graphics accelerator via which video output is to be provided;
the system is to store, at least in part, the stored video;
the system is to display, using the graphics accelerator, via a television, a graphical user interface for use in selecting the start time, end time, and slow motion;
the graphical user interface comprises a storyboard via which frames of the stored video are to be displayed, at least in part;
the system is also to receive other selected video input for display via the television, the other selected video input being capable of comprising cable television-based input;
the system is capable of:
selectively editing the clip by changing frame light intensity of selected frames of the clip;
after a time period has elapsed in which user selection via the graphical user interface of the start time, time interval, and number of frames has not been made, automatically entering default values for the start time, time interval, and number of frames.

12. The media of claim 11, said sequence including receiving a selection for fast motion of the clip.

13. The media of claim 11, wherein the graphical user interface is to be used to select slow or fast motion playback of the clip.

14. The media of claim 11, said sequence including receiving a selection of a fade-in or fade-out for the clip.

15. The media of claim 11, said sequence including discarding frames from the video to produce the clip.

16. The media of claim 11, said sequence including receiving a parental control for the clip.

17. The media of claim 16, said sequence including enabling the clip to be tagged for parental control such that an access code is needed to view the clip.

18. The media of claim 11, said sequence including enabling the selections via a handheld device.

19. The media of claim 11, wherein the graphical user interface comprises icons for the entry of information concerning the start time, time interval and number of frames for the clip.

20. An apparatus comprising:
a processor to receive a selection of a start time within a stored video, receive a selection of an end time within the stored video to define a video clip playable separately from said stored video, and receive a selection to change the clip's frame rate; and
a storage coupled to said processor;
wherein:
the apparatus comprises a broadcast pause and resume set-top box-based system;
the system comprises a graphics accelerator via which video output is to be provided;
the system is to store, at least in part, the stored video;
the system is to display, using the graphics accelerator, via a television, a graphical user interface for use in selecting the start time, end time, and frame rate;
the graphical user interface comprises a storyboard via which frames of the stored video are to be displayed, at least in part;
the system is also to receive other selected video input for display via the television, the other selected video input being capable of comprising cable television-based input;
the system is capable of:
selectively editing the clip by changing frame light intensity of selected frames of the clip;
after a time period has elapsed in which user selection via the graphical user interface of the start time, time interval, and number of frames has not been made, automatically entering default values for the start time, time interval, and number of frames.

21. The apparatus of claim 20 wherein the frame rate changes to implement slow motion playback.

22. The apparatus of claim 21, wherein said processor is to receive a selection for fast motion of the clip.

23. The apparatus of claim 20, wherein the graphical user interface is to be used to select slow or fast motion playback of the clip.

24. The apparatus of claim 20, wherein said processor is to receive a selection of a fade-in or fade-out for the clip.

25. The apparatus of claim 20, wherein said processor is to discard frames from the video to produce the clip.

26. The apparatus of claim 20, wherein said processor is to receive a parental control for the clip.

27. The apparatus of claim 26, wherein said processor is to tag the clip for parental control such that an access code is needed to view the clip.

28. The apparatus of claim 20 wherein the apparatus comprises a remote control device.

29. The apparatus of claim 20, wherein said graphical user interface comprises icons for the entry of information concerning the start time, time interval and number of frames for the clip.

* * * * *